United States Patent
Zheng

(10) Patent No.: US 11,657,128 B2
(45) Date of Patent: May 23, 2023

(54) TEMPORARY PASSWORD USAGE CONTROL METHOD AND SYSTEM

(71) Applicants: Smart Electronic Industrial (Dong Guan) Co., Ltd., Guang Dong (CN); Li Zheng, Kowloon (HK)

(72) Inventor: Li Zheng, Kowloon (HK)

(73) Assignee: Smart Electronic Industrial (Dong Guan) Co., Ltd.

( * ) Notice: Subject to any disclaimer, the term of this patent is extended or adjusted under 35 U.S.C. 154(b) by 395 days.

(21) Appl. No.: 16/981,186

(22) PCT Filed: Mar. 6, 2019

(86) PCT No.: PCT/CN2019/077204
§ 371 (c)(1),
(2) Date: Sep. 15, 2020

(87) PCT Pub. No.: WO2019/174507
PCT Pub. Date: Sep. 19, 2019

(65) Prior Publication Data
US 2021/0026936 A1    Jan. 28, 2021

(30) Foreign Application Priority Data

Mar. 16, 2018 (CN) .......................... 201810220360.0

(51) Int. Cl.
*G06F 7/58* (2006.01)
*G06F 21/31* (2013.01)

(52) U.S. Cl.
CPC .............. *G06F 21/31* (2013.01); *G06F 7/588* (2013.01)

(58) Field of Classification Search
CPC .................................. G06F 21/31; G06F 7/588
See application file for complete search history.

(56) References Cited

U.S. PATENT DOCUMENTS

| | | | |
|---|---|---|---|
| 11,100,735 B2 * | 8/2021 | Wang | G07C 9/00666 |
| 11,120,656 B2 * | 9/2021 | Ye | H04L 67/10 |
| 2019/0036913 A1 * | 1/2019 | Tzur-David | H04L 63/18 |

FOREIGN PATENT DOCUMENTS

| | | | |
|---|---|---|---|
| CN | 101727704 A | 6/2010 | |
| CN | 104464057 A | 3/2015 | |

(Continued)

OTHER PUBLICATIONS

International Search Report for PCT/CN2019/077204 dated May 15, 2019; 3 pages.

(Continued)

*Primary Examiner* — Tongoc Tran
(74) *Attorney, Agent, or Firm* — Lerner David LLP

(57) ABSTRACT

A method and system for controlling the use of a temporary password is provided, and the method includes the steps: generating by a random code generator end a preset number of temporary passwords after successful matching between the random code generator end and the random code use end; sending by the random code generator end at least one temporary password among the preset number of temporary passwords to the random code use end for storage therein to form a preset temporary password; and receiving a current temporary password, comparing the current temporary password with each of the pre-stored temporary passwords, and indicating successful verification if the current temporary password is the same as one of the pre-stored temporary passwords. The method can generate multiple temporary passwords at once, and control and manage the use of temporary passwords by adding function codes to the temporary passwords.

9 Claims, 1 Drawing Sheet

(56) References Cited

FOREIGN PATENT DOCUMENTS

| | | | |
|---|---|---|---|
| CN | 104966336 | A | 10/2015 |
| CN | 105120007 | A | 12/2015 |
| CN | 105184935 | A | 12/2015 |
| CN | 105678871 | A | 6/2016 |
| CN | 105844744 | A | 8/2016 |
| CN | 106131179 | A | 11/2016 |
| CN | 106780895 | A | 5/2017 |
| CN | 107492169 | A | 12/2017 |
| CN | 107730676 | A | 2/2018 |
| CN | 108449177 | A | 8/2018 |
| WO | 2006051592 | A1 | 5/2006 |

OTHER PUBLICATIONS

Search Report dated Nov. 6, 2018 from Office Action for Chinese Office Action dated Nov. 14, 2018. 3 pgs.
Search Report dated Jan. 9, 2019 from Office Action for Chinese Office Action dated Jan. 18, 2019. 2 pgs.

* cited by examiner

TEMPORARY PASSWORD USAGE CONTROL METHOD AND SYSTEM

CROSS-REFERENCE TO RELATED APPLICATIONS

The present application is a national phase entry under 35 U.S.C § 371 of International Application No. PCT/CN2019/077204 filed Mar. 6, 2019, which claims priority from Chinese Application No. 201810220360.0 filed Mar. 16, 2018, all of which are hereby incorporated herein by reference.

FIELD OF THE INVENTION

Various embodiments of the present application relate to the technical field of smart door locks, and in particular to a temporary password usage control method and system.

BACKGROUND OF THE INVENTION

As people's awareness of anti-theft is getting higher and higher, door locks are the key to people's anti-theft. In addition, people have higher and higher requirements for the convenience and intelligence of door locks. Many smart door locks in the prior art have the function of a temporary password, but in the existing temporary password function, the management and use of the temporary password is not perfect enough, and the operation is not flexible enough.

In the prior art technical solutions, there are the following drawbacks:

1. The activation control and invalidation handling mechanism of the temporary password is not flexible enough and the operation is also cumbersome;
2. It is necessary to temporarily authorize the user to install the door lock APP, and obtain the temporary password and unlock the lock by operating the door lock APP;
3. The efficiency of generating temporary passwords is low. Every time a temporary password is generated, the temporary password needs to be regenerated every time a temporary authorized user is changed; and
4. In the process of using the temporary password, the security measures of the temporary password are not perfect enough. After the device with the control APP such as a mobile phone is installed, the password is easily leaked out.

Therefore, the present inventor realizes that in the prior art, the process of activating and invalidating the password of a smart lock is relatively cumbersome, the management of the temporary password is not flexible enough, the password security measures are not perfect, and the user experience is poor.

SUMMARY OF THE INVENTION

In view of the foregoing problems, the embodiments of the present application propose a method and system for controlling the use of temporary passwords, which realize the control and management of the use of temporary passwords through the control of a random code generator end to a random code user end.

To solve the foregoing problems, the embodiments of the present application adopt the following technical solutions in various aspects:

An embodiment of the present application provides a method for controlling the use of a temporary password, which includes the following steps:

generating by a random code generator end a preset number of temporary passwords after successful matching between the random code generator end and the random code use end;

sending by the random code generator end at least one temporary password among the preset number of temporary passwords to the random code use end for storage therein to form a preset temporary password; and receiving by the random code user end a current temporary password, comparing the current temporary password with each of the pre-stored temporary passwords, and indicating successful verification if the current temporary password is the same as one of the pre-stored temporary passwords.

Specifically, each temporary password includes a random code and a function code, and the function code is added to the temporary password in a suffix, prefix, or embedded form.

Specifically, the function of the function code includes any one or more of the following functions:

controlling an activation state of the temporary password, indicating the timeliness of the temporary password, or representing the identity information of a user of the temporary password.

Specifically, the step of receiving by the random code user end a current temporary password, comparing the current temporary password with each of the pre-stored temporary passwords, and indicating successful verification if the current temporary password is the same as one of the pre-stored temporary passwords includes:

when being confirmed by the random code use end that the current temporary password includes a function code, determining what function is represented by the function code; and performing corresponding operations according to the function of the function code.

Preferably, it also includes:

performing post-successful verification operations when the current temporary password does not contain the function code, and it is determined that the current temporary password is already in an activated state, and the current temporary password is the same as one of the pre-stored temporary passwords.

Specifically, the step of generating by a random code generator end a preset number of temporary passwords after successful matching between the random code generator end and a random code use end includes:

generating by the random code generator respective function codes corresponding to the random codes, when generating the random codes.

Preferably, it further includes, after sending at least one temporary password to the random code use end for storage therein:

the random code generator receiving a password acquisition instruction, and displaying any one of the pre-stored temporary passwords on a user interface, so that said any one of the pre-stored temporary passwords is conveyed to the user and is marked.

Specifically, it further includes, after the random code generator receiving a password acquisition instruction, and displaying any one of the pre-stored temporary passwords on a user interface, so that said any one of the pre-stored temporary passwords is conveyed to the user and is marked:

displaying the number of remaining pre-stored temporary passwords on the user interface.

Specifically, it further includes:

when the number of the remaining pre-stored temporary passwords is less than the preset number, sending a notification message for resetting the temporary password.

Specifically, it further includes, after the step of receiving by the random code user end a current temporary password, comparing the current temporary password with each of the pre-stored temporary passwords, and indicating successful verification if the current temporary password is the same as one of the pre-stored temporary passwords:

invaliding the pre-stored temporary password when the random code use end detects that a corresponding device is restored to an initial state.

Preferably, the step of generating by a random code generator end a preset number of temporary passwords after successful matching between the random code generator end and the random code use end includes:

the random code generator end receiving a pairing code of the random code use end, and matching the pairing code with the random code use end; and automatically generating the temporary passwords by a built-in encryption algorithm of the random code generator end after the matching is successful.

Specifically, the random code generator end receiving a pairing code of the random code use end, and matching the pairing code with the random code use end includes:

the random code generator receiving the pairing code and performing authentication according to the pairing code, and when the authentication is passed, the random code generator end and the random code use end are matched successfully, so that the random code generator end obtains the control authority of the random code use end.

This application provides a device for controlling the use of a random code, including a random code generator end and a random code use end, where:

the random code generator end is used for generating a preset number of temporary passwords after successful matching between the random code generator end and the random code use end; and the random code use end is used for receiving a current temporary password, comparing the current temporary password with each of the pre-stored temporary passwords, and indicating successful verification if the current temporary password is the same as one of the pre-stored temporary passwords.

Compared with the prior art, the technical solutions of the embodiments of the present application have at least the following advantages:

1. The embodiments of the invention provide a temporary password usage control method. The random code generator end generates a preset number of temporary passwords after successful matching between the random code generator end and the random code use end, and sends at least one temporary password among the preset number of temporary passwords to the random code use end for storage therein to form a preset temporary password. The random code user end receives a current temporary password, compares the current temporary password with each of the pre-stored temporary passwords, and indicates successful verification if the current temporary password is the same as one of the pre-stored temporary passwords. The embodiment of the application uses this mechanism to generate multiple temporary passwords at once and store them in the random code use end. The temporary password is managed through the random code generator end, and the verification process of the random code use end is also controlled. On the other hand, the embodiment of this application does not need to temporarily authorize the user to operate the APP in person to obtain a temporary password to unlock. The generated temporary passwords can be sent to the temporarily authorized user through various methods remotely, which improves the flexibility of the solution.

2. In the method described in the embodiments of the present application, the temporary password includes a random code and a function code, and the function code can be used to control the activation state of the temporary password, and to indicate the timeliness or use of the temporary password, and to represent the user's identity information of the temporary password. In the embodiments of the application, the function code is used to quickly activate the temporary password, and flexibly control the time limit and the number of uses of the temporary password. The embodiments of the application can identify the identity information of the person who unlocked the door and entered a room through the setting of the function code, to realize the recording of the situation. In addition, the function of the function code can also be set according to actual application situations, and is not limited to the above three functions.

3. The method described in the embodiment of the present application may also display the remaining number of the pre-stored temporary passwords on the random code generator end, so that the applicant of the temporary password knows the usage of the password. In addition, this embodiment of the application can also remind the applicant of temporary passwords to set new temporary passwords in time when the number of remaining temporary passwords reaches a certain threshold. Finally, the password generated by the random code generator end is only visible to the applicant of the temporary passwords. Even if the terminal device (such as a mobile phone loaded with the corresponding APP) is lost, there is no fear of password leakage, which improves the security of the solution.

In summary, the embodiments of this application solve the shortcomings in the prior art that the activation control and invalidation processing mechanism of the temporary passwords are not flexible enough and the operation is complicated and obtain enhanced user experience. In the prior art, it is necessary to temporarily authorize users to install the door lock APP, and obtain the temporary passwords and unlock the lock by operating the door lock APP.

BRIEF DESCRIPTION OF THE DRAWINGS

In order to describe the technical solutions of the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

DETAILED DESCRIPTION OF THE INVENTION

Figure 1:
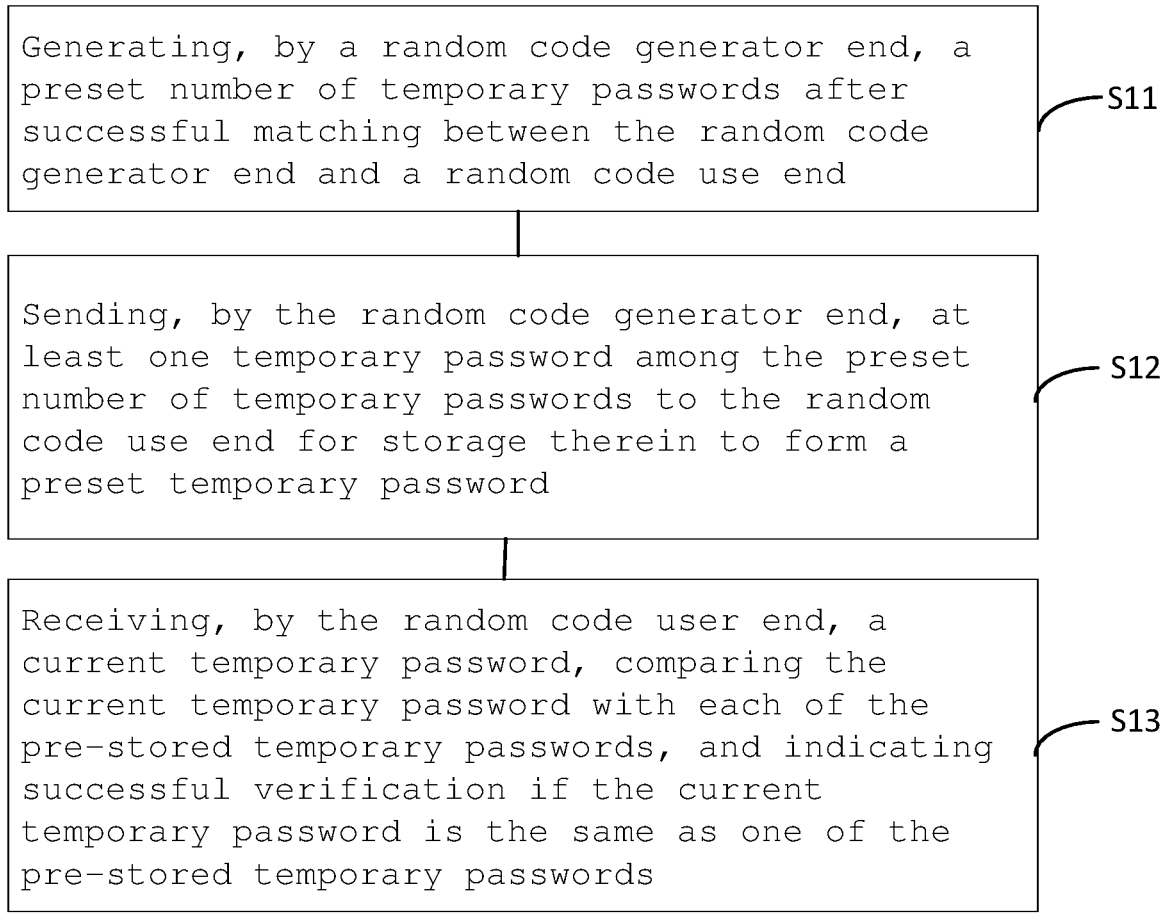
FIG. 1 is a flowchart of an embodiment of a method for controlling the use of a temporary password according to an embodiment of this application.

In order to enable those skilled in the art to better understand the solutions of the present application, the technical solutions in the embodiments of the present application will be described clearly and completely in conjunction with the accompanying drawings in the embodiments of the present application.

In some of the procedures described in the specification and claims of this application and the above-mentioned drawings, multiple operations appearing in a specific order are included, but it should be clearly understood that these operations may not be in the order in which they appear in this document. The sequence numbers of operations such as S11, S12, etc., are only used to distinguish different operations, and the sequence number itself does not represent any execution order. In addition, these processes may include more or fewer operations, and these operations may be executed sequentially or in parallel. It should be noted that the description of "first" and "second" in this article are used to distinguish different messages, devices, modules, etc., and do not represent a sequence, nor do they limit the "first" and "second" to be different types.

It should be understood by person of the ordinary skill in the art that unless otherwise specified, terms "a", "one", "the" and "said" in singular form may also be used in plural form. It should be further understood that the term "include" as used herein means presence of said feature, integer, step, operation, element and/or component, but not excluding presence of one or more additional other feature, integer, step, operation, element and/or component and/or their combination. The term "and/or" includes one or more related elements and all combination thereof.

It should be understood by person of the ordinary skill in the art that unless otherwise specified, all the terminology (including technical and scientific terms) have their ordinary meaning as understood by person of the art. It should also be understood that terms such as those defined in general dictionaries should be understood to have a meaning consistent with the meaning in the context of the prior art, and unless specifically defined as here, they will not be idealized or overly Explain the formal meaning.

The technical solutions in the embodiments of the present application will be clearly and completely described below in conjunction with the drawings in the embodiments of the present application, wherein the same or similar reference numerals indicate the same or similar elements or elements with the same or similar functions. Obviously, the described embodiments are only a part of the embodiments of the present application, rather than all the embodiments. Based on the embodiments in this application, all other embodiments obtained by those skilled in the art without creative work are within the protection scope of this application.

Please refer to FIG. 1. In a method for controlling the use of a temporary password provided by this application, in a specific implementation manner, it specifically includes the following steps:

S11: generating by a random code generator end a preset number of temporary passwords after successful matching between the random code generator end and the random code use end.

In the embodiment of the present application, after the random code generator end and the random code use end are successfully matched, the use authority of the random code use end can be obtained.

In a possible design, the random code generator end and the random code use end are matched by the following scheme:

the random code generator end receives a pairing code of the random code use end, and matches the pairing code with the random code use end; and automatically generates the temporary passwords by a built-in encryption algorithm of the random code generator end after the matching is successful.

In detail, the random code generator receives the pairing code and performing authentication according to the pairing code, and when the authentication is passed, the random code generator end and the random code use end are matched successfully, so that the random code generator end obtains the control authority of the random code use end.

In a possible application scenario, the user operates the random code generator end to pop up an input box on a user interface to enter the factory-set password of the random code use end. After the user enters the correct factory-set password of the random code use end, the authentication is passed. The random code generator end can send corresponding instructions to the random code user end to control the random code user end.

In the embodiment of the present application, the random code generator end may be a door lock APP on the user side, or a door lock official account on the WeChat APP. The random code generator end can also be other devices for generating the temporary passwords, which is not specifically limited here. The random code use end is a door lock device such as a smart door lock.

Preferably, each temporary password includes a random code and a function code. The random code generator end automatically generates a preset number of random codes after successfully matching with the random code use end, and at the same time, the random code generator end also generates a corresponding preset number of function codes. The function code is added to the temporary password in a suffix, prefix, or embedded form.

Please refer to Table 1 below. Table 1 is a possible expression of the temporary password.

TABLE 1

The combination of a possible temporary password

| Temporary password | Function code | Random code | Adding manner of the function code |
|---|---|---|---|
| 12345678001 | 001 | 12345678 | Suffix |
| 00112345678 | 001 | 12345678 | Prefix |
| 12001345678 | 001 | 12345678 | Embedding |

As shown in Table 1, a first temporary password is 12345678001, which includes a random code 12345678+ function code 001, and the function code 001 is added as a suffix to the temporary password. The function code described in this application can be added to the temporary password in various forms, so that the expression form of the temporary password in this solution is diversified and the flexibility of this solution is improved.

Furthermore, the function of the function code includes the following function:

controlling an activation state of the temporary password.

The random code generator generates respective function codes corresponding to the random codes, when generating the random codes. The random code and the function code together constitute a temporary password. When the random code generator end sets the function code to control the activation state of the temporary password, the random code use end uses the function of the function code according to the setting, and when receiving the function code, the temporary password is activated. Correspondingly, when the function code is set to control the invalidation of the temporary password, the random code use end performs deactivation processing on the temporary password when receiving the function code according to the function of the set function code. For example, when a preset function code 001 is a function code used to control the activation state of a temporary password, and when the random code use end receives the random code 001, the temporary password will be activated.

Furthermore, the function of the function code includes the following function:

indicating the timeliness of the temporary password by the function code.

The timeliness represents the use period or the upper limit of the number of uses of the temporary password. When the function code is used to indicate the use period of the temporary password, the random code use end will invalidate the temporary password when the use period of the function code ends. When the function code is used to indicate the upper limit of the number of uses of the temporary password, the random code use end will invalidate the temporary password when the number of uses of the function code reaches the upper limit. For example, when a preset function code 002 is used to indicate that the number of uses of the temporary password is 2, the random code use end will invalidate the temporary password after the corresponding temporary password has been used twice. When a preset function code 003 is used to indicate that the use time of the temporary password is 3 days, the random code use end will invalidate the temporary password after 3 days of use of the corresponding temporary password.

Furthermore, the function of the function code includes the following function:

representing the identity information of a user of the temporary password by the function code.

The function code can be used to indicate the identity information of the corresponding temporarily authorized user, to record the entry and exit of the house and feedback the corresponding record information in response to an instruction of the random code generator end. For example, the identity information of the temporarily authorized user may include the applicant of the temporary password, the temporarily authorized user, the temporary cleaning staff, the house host, etc.

In addition, the function code is also used to specify the sequence of the temporary passwords stored by the random code user end, to realize the reuse of the pre-stored passwords without the need to repeatedly generate the temporary passwords. The functions of the function codes can be set and expanded according to specific application scenarios, and their functions are not limited to the above types, and will not be listed here. The embodiments of the present application use this mechanism to diversify the use of the temporary password and provide high flexibility.

It further includes the following step:

S12: sending by the random code generator end at least one temporary password among the preset number of temporary passwords to the random code use end for storage therein to form a preset temporary password.

In the embodiment of the present application, after the random code generator end generates a preset number of the temporary passwords, they are sent to the random code use end for storage immediately. Here, the random code generator end can send the temporary passwords to the random code use end by any of the following methods:

WIFI, Bluetooth, NFC, infrared or audio data import. The specific data transmission method may also be other methods, which are not specifically limited here.

In the embodiment of the present application, the random code use end may store the temporary passwords in the form of a temporary password table in a certain order in the random code use end. When a temporary password applicant selects one of the temporary passwords through the random code generator end and transmits it to a temporarily authorized user, the random code user end can record: which temporary password in the temporary password table is being used.

Please refer to Table 2 below. Table 2 shows a storage form of the possible temporary password table and the meaning of each function code.

TABLE 2

A possible temporary password storage form and the corresponding functions of the corresponding function codes

| Temporary password ID | Temporary password | Random code | Function code | Function of the function code |
|---|---|---|---|---|
| ID1 | 12345678001 | 12345678 | 001 | For controlling the activation of temporary passwords |
| ID2 | 00212345678 | 12345678 | 002 | For indicating that the temporary password is a one-time password |
| ID3 | 12003345678 | 12345678 | 003 | For indicating the use period of the temporary password is 3 days |
| ID4 | 123456780044 | 12345678 | 0044 | Used to indicate that the user of the temporary password is a cleaning staff |
| ID5 | 1234567855 | 12345678 | 55 | Used to indicate the order of temporary passwords currently in use |

TABLE 2-continued

A possible temporary password storage form and the corresponding functions of the corresponding function codes

| Temporary password ID | Temporary password | Random code | Function code | Function of the function code |
|---|---|---|---|---|
| ID6 | 12345678666 | 12345678 | 666 | Used to control the invalidation of temporary passwords |

As shown in Table 2 above, the temporary passwords can be stored in the random code use end in the form of a temporary password table. The function code in the temporary password can be 2, 3 or 4 digits. Among the temporary passwords, according to different presets, the function codes can represent different meanings or functions. In Table 2, the function code 002 in the temporary password 00212345678 represents that the temporary password is a one-time password. After the random code use end uses the temporary password once, the temporary password will be invalidated. For example, you can delete the temporary password corresponding to the function code from the pre-stored temporary password table, or you can keep it, and only cancel its activation state for reuse next time. The function code 003 in the temporary password 12003345678 is used to indicate that the use period of the temporary password is 3 days. Then the random code use end will invalidate the temporary password three days after the temporary password is used. The function code 666 in the temporary password 12345678666 is used to control the invalidation of the temporary password, and when the random code use end receives the function code, the temporary password will be invalidated.

Specifically, after sending at least one temporary password to the random code use end for storage therein, the random code generator receives a password acquisition instruction, and displays any one of the pre-stored temporary passwords on a user interface, so that said any one of the pre-stored temporary passwords is conveyed to the user and is marked.

Preferably, after the random code generator received a password acquisition instruction, and displaying any one of the pre-stored temporary passwords on a user interface, it displays the number of remaining pre-stored temporary passwords on the user interface. Preferably, when the number of the remaining pre-stored temporary passwords is less than the preset number, a notification message for resetting the temporary password is sent.

In a possible application scenario, the random code generator end resets the temporary passwords in the following two ways:

first, when the applicant of the temporary password is close to the random code use end, generally within 10 meters, the applicant of the temporary password can send the newly generated temporary passwords to the random code use end through a Bluetooth interface; and second, when the applicant of the temporary passwords is far away from the door lock, generally 10 meters away, when the temporary passwords are generated, they are forwarded to a next temporarily authorized user. The next temporarily authorized user can download a door lock APP, and send a preset number of new temporary passwords to the random code use end through the Bluetooth interface.

It further includes the following step:

S13: receiving by the random code user end a current temporary password, comparing the current temporary password with each of the pre-stored temporary passwords, and indicating successful verification if the current temporary password is the same as one of the pre-stored temporary passwords.

In this embodiment, when it is confirmed by the random code use end that the current temporary password includes a function code, determine what function is represented by the function code. Corresponding operations are performed according to the function of the function code. Post-successful verification operations are performed when the current temporary password does not contain the function code, and when it is determined that the current temporary password is already in an activated state, and the current temporary password is the same as one of the pre-stored temporary passwords.

In the embodiment of the present application, the operation after the verification is successful may include an unlocking operation, an opening operation of the device, and the like. The method for controlling the use of a temporary password described in the embodiments of this application can be used to open smart door locks, and can also be used in any other application scenarios that require passwords, for example, control of the operation authority of special equipment in production scenarios, item rental, etc.

Specifically, the random code use end detects whether the temporary password includes a function code. When it is detected that the function code exists, the specific function of the function code is further determined according to a pre-stored temporary password table containing each temporary password.

When the function code is used to control the activation state of the temporary password, the random code use end activates the current temporary password according to the activation code of the current temporary password. When the function code is used to indicate the timeliness of the temporary password, according to the function code, and when the time limit specified by the function code arrives, or when the number of uses specified by the function code reaches the upper limit, the current temporary password is invalidated.

Preferably, the random code use end is also used to detect the status of a corresponding device. When the random code use end detects that the corresponding device is restored to an initial state, it performs corresponding invalidation processing on the temporary password. For example, when it is detected that a door lock device is opened first and then closed, corresponding invalidation processing is performed on the temporary password.

Figure 2:
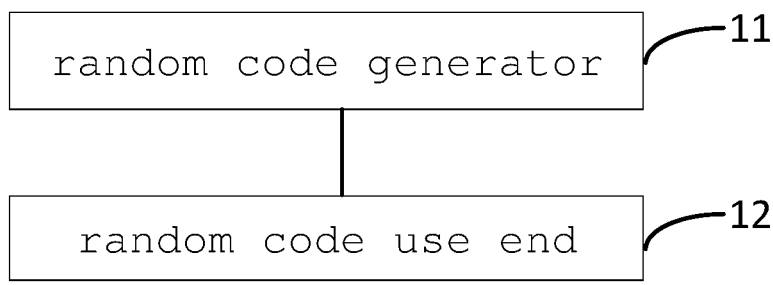
FIG. 2 is a structural block diagram of a system for controlling the use of a temporary password according to an embodiment of the application.

As shown in FIG. 2, an embodiment of the present application also provides a device for controlling the use of a temporary password, which includes a random code generator end 11 and a random code use end 12.

The random code generator end 11 is used for generating a preset number of temporary passwords after successful matching between the random code generator end and the random code use end.

In the embodiment of the present application, after the random code generator end and the random code use end are successfully matched, the use authority of the random code use end can be obtained.

In a possible design, the random code generator end and the random code use end are matched by the following scheme:

the random code generator end receives a pairing code of the random code use end, and matches the pairing code with the random code use end; and automatically generates the temporary passwords by a built-in encryption algorithm of the random code generator end after the matching is successful.

In detail, the random code generator receives the pairing code and performing authentication according to the pairing code, and when the authentication is passed, the random code generator end and the random code use end are matched successfully, so that the random code generator end obtains the control authority of the random code use end.

In a possible application scenario, the user operates the random code generator end to pop up an input box on a user interface to enter the factory-set password of the random code use end. After the user enters the correct factory-set password of the random code use end, the authentication is passed. The random code generator end can send corresponding instructions to the random code user end to control the random code user end.

In the embodiment of the present application, the random code generator end may be a door lock APP on the user side, or a door lock official account on the WeChat APP. The random code generator end can also be other devices for generating the temporary passwords, which is not specifically limited here. The random code use end is a door lock device such as a smart door lock.

Preferably, each temporary password includes a random code and a function code. The random code generator end automatically generates a preset number of random codes after successfully matching with the random code use end, and at the same time, the random code generator end also generates a corresponding preset number of function codes. The function code is added to the temporary password in a suffix, prefix, or embedded form.

As shown in Table 1, a first temporary password is 12345678001, which includes a random code 12345678+ function code 001, and the function code 001 is added as a suffix to the temporary password. The function code described in this application can be added to the temporary password in various forms, so that the expression form of the temporary password in this solution is diversified and the flexibility of this solution is improved.

Furthermore, the function of the function code includes the following function:

controlling an activation state of the temporary password.

The random code generator generates respective function codes corresponding to the random codes, when generating the random codes. The random code and the function code together constitute a temporary password. When the random code generator end sets the function code to control the activation state of the temporary password, the random code use end uses the function of the function code according to the setting, and when receiving the function code, the temporary password is activated. Correspondingly, when the function code is set to control the invalidation of the temporary password, the random code use end performs deactivation processing on the temporary password when receiving the function code according to the function of the set function code. For example, when a preset function code 001 is a function code used to control the activation state of a temporary password, and when the random code use end receives the random code 001, the temporary password will be activated.

Furthermore, the function of the function code includes the following function:

indicating the timeliness of the temporary password by the function code.

The timeliness represents the use period or the upper limit of the number of uses of the temporary password. When the function code is used to indicate the use period of the temporary password, the random code use end will invalidate the temporary password when the use period of the function code ends. When the function code is used to indicate the upper limit of the number of uses of the temporary password, the random code use end will invalidate the temporary password when the number of uses of the function code reaches the upper limit. For example, when a preset function code 002 is used to indicate that the number of uses of the temporary password is 2, the random code use end will invalidate the temporary password after the corresponding temporary password has been used twice. When a preset function code 003 is used to indicate that the use time of the temporary password is 3 days, the random code use end will invalidate the temporary password after 3 days of use of the corresponding temporary password.

Furthermore, the function of the function code includes the following function:

representing the identity information of a user of the temporary password by the function code.

The function code can be used to indicate the identity information of the corresponding temporarily authorized user, to record the entry and exit of the house and feedback the corresponding record information in response to an instruction of the random code generator end. For example, the identity information of the temporarily authorized user may include the applicant of the temporary password, the temporarily authorized user, the temporary cleaning staff, the house host, etc.

In addition, the function code is also used to specify the sequence of the temporary passwords stored by the random code user end, to realize the reuse of the pre-stored passwords without the need to repeatedly generate the temporary passwords. The functions of the function codes can be set and expanded according to specific application scenarios, and their functions are not limited to the above types, and will not be listed here. The embodiments of the present application use this mechanism to diversify the use of the temporary password and provide high flexibility.

In the embodiment of the present application, after the random code generator end generates a preset number of the temporary passwords, they are sent to the random code use end for storage immediately. Here, the random code generator end can send the temporary passwords to the random code use end by any of the following methods:

WIFI, Bluetooth, NFC, infrared or audio data import. The specific data transmission method may also be other methods, which are not specifically limited here.

In the embodiment of the present application, the random code use end may store the temporary passwords in the form of a temporary password table in a certain order in the random code use end. When a temporary password applicant selects one of the temporary passwords through the random code generator end and transmits it to a temporarily authorized user, the random code user end can record: which temporary password in the temporary password table is being used.

Please refer to Table 2 below. Table 2 shows a storage form of the possible temporary password table and the meaning of each function code.

As shown in Table 2 above, the temporary passwords can be stored in the random code use end in the form of a temporary password table. The function code in the temporary password can be 2, 3 or 4 digits. Among the temporary passwords, according to different presets, the function codes can represent different meanings or functions. In Table 2, the function code 002 in the temporary password 00212345678 represents that the temporary password is a one-time password. After the random code use end uses the temporary password once, the temporary password will be invalidated. For example, you can delete the temporary password corresponding to the function code from the pre-stored temporary password table, or you can keep it, and only cancel its activation state for reuse next time. The function code 003 in the temporary password 12003345678 is used to indicate that the use period of the temporary password is 3 days. Then the random code use end will invalidate the temporary password three days after the temporary password is used. The function code 666 in the temporary password 12345678666 is used to control the invalidation of the temporary password, and when the random code use end receives the function code, the temporary password will be invalidated.

Specifically, after sending at least one temporary password to the random code use end for storage therein, the random code generator receives a password acquisition instruction, and displays any one of the pre-stored temporary passwords on a user interface, so that said any one of the pre-stored temporary passwords is conveyed to the user and is marked.

Preferably, after the random code generator received a password acquisition instruction, and displaying any one of the pre-stored temporary passwords on a user interface, it displays the number of remaining pre-stored temporary passwords on the user interface. Preferably, when the number of the remaining pre-stored temporary passwords is less than the preset number, a notification message for resetting the temporary password is sent.

In a possible application scenario, the random code generator end resets the temporary passwords in the following two ways:

first, when the applicant of the temporary password is close to the random code use end, generally within 10 meters, the applicant of the temporary password can send the newly generated temporary passwords to the random code use end through a Bluetooth interface; and second, when the applicant of the temporary passwords is far away from the door lock, generally 10 meters away, when the temporary passwords are generated, they are forwarded to a next temporarily authorized user. The next temporarily authorized user can download a door lock APP, and send a preset number of new temporary passwords to the random code use end through the Bluetooth interface.

The random code use end 12 is used for receiving a current temporary password, comparing the current temporary password with each of the pre-stored temporary passwords, and indicating successful verification if the current temporary password is the same as one of the pre-stored temporary passwords.

In this embodiment, when it is confirmed by the random code use end that the current temporary password includes a function code, determine what function is represented by the function code. Corresponding operations are performed according to the function of the function code. Post-successful verification operations are performed when the current temporary password does not contain the function code, and when it is determined that the current temporary password is already in an activated state, and the current temporary password is the same as one of the pre-stored temporary passwords.

In the embodiment of the present application, the operation after the verification is successful may include an unlocking operation, an opening operation of the device, and the like. The method for controlling the use of a temporary password described in the embodiments of this application can be used to open smart door locks, and can also be used in any other application scenarios that require passwords, for example, control of the operation authority of special equipment in production scenarios, item rental, etc.

Specifically, the random code use end detects whether the temporary password includes a function code. When it is detected that the function code exists, the specific function of the function code is further determined according to a pre-stored temporary password table containing each temporary password.

When the function code is used to control the activation state of the temporary password, the random code use end activates the current temporary password according to the activation code of the current temporary password. When the function code is used to indicate the timeliness of the temporary password, according to the function code, and when the time limit specified by the function code arrives, or when the number of uses specified by the function code reaches the upper limit, the current temporary password is invalidated.

Preferably, the random code use end is also used to detect the status of a corresponding device. When the random code use end detects that the corresponding device is restored to an initial state, it performs corresponding invalidation processing on the temporary password. For example, when it is detected that a door lock device is opened first and then closed, corresponding invalidation processing is performed on the temporary password.

In one possible application scenario, the method for controlling the use of the temporary password described in the embodiments of this application is applied to house rental. The method can be implemented through the following steps:

1. when a door lock APP is paired for the first time and the factory password of the door lock end is entered, 50 8-digit temporary passwords are randomly generated;

2. the door lock APP sets these 50 8-digit temporary passwords into the door lock end through the Bluetooth interface;

3. the host operates the door lock APP to obtain a temporary password and share it with the tenant through different methods such as SMS and Email;

4. after receiving the temporary password, the tenant needs to enter the 8-digit temporary password on a keyboard at the door lock end and add the preset suffix 000 to activate the temporary password;

5. when the temporary password is activated, the tenant can use the 8-digit temporary password to open the door;

6. when a next tenant activates a next temporary password on the keyboard at the door lock end, the current temporary password becomes invalid immediately;

7. after the next tenant uses this new temporary password, he will reply to the host, who will mark this temporary password as used;

8. every time a temporary password is used, the host can know how many temporary passwords are available;

9. when the tenant leaves, he needs to use the current temporary password and add a suffix 888 to check out, and after checking out, the current temporary password will become invalid; and 10. when the available temporary passwords are less than the set number, and if the host wants to continue to assign temporary passwords, the APP will remind the host to set new 50 temporary passwords; there are two ways to set new temporary passwords: first, when the host is far away from the door lock, and when the new temporary passwords need to be passed on to the next tenant, the next tenant can download the door lock APP, and set 50 new temporary passwords on the door lock end through the Bluetooth interface; second, when the host is next to the door lock end, the host himself connects the door lock end via Bluetooth and sets a new 50 temporary passwords to store the door lock end.

In another possible application scenario, the method for controlling the use of the temporary password described in the embodiments of this application is applied to house rental. The method can be implemented through the following steps:

1. when a door lock APP is paired for the first time and the factory password of the door lock end is entered, 50 8-digit temporary passwords are randomly generated;

2. the door lock APP sets these 50 8-digit temporary passwords into the door lock end through the Bluetooth interface;

3. the host operates the door lock APP to obtain a temporary password and share it with the tenant through different methods such as SMS and Email;

4. after receiving the temporary password, the tenant needs to enter the 8-digit temporary password on a keyboard at the door lock end and add the preset suffix 66 to activate the temporary password;

5. when the tenant uses the received temporary password to unlock a door, the door is immediately opened after the temporary password verification is successful;

6. when the door is closed, this temporary password becomes invalid; and 7. when the available temporary passwords are less than the set number, and if the host wants to continue to assign temporary passwords, the APP will remind the host to set new 50 temporary passwords; there are two ways to set new temporary passwords: first, when the host is far away from the door lock, and when the new temporary passwords need to be passed on to the next tenant, the next tenant can download the door lock APP, and set 50 new temporary passwords on the door lock end through the Bluetooth interface; second, when the host is next to the door lock end, the host himself connects the door lock end via Bluetooth and sets a new 50 temporary passwords to store the door lock end.

In yet another possible application scenario, the method for controlling the use of the temporary password described in the embodiments of this application is applied to house rental. The method can be implemented through the following steps:

1. when a door lock APP is paired for the first time and the factory password of the door lock end is entered, 50 8-digit temporary passwords are randomly generated;

2. after the temporary passwords are generated, a 4-digit function code table is generated, and each function code table represents a specific temporary password usage method; for example, 1356 represents a one-time password, 3679 represents the password can be used for 1 day, and 3879 represents the password can be used for 2 days.

3. the door lock APP sets 50 8-digit random codes and 4-digit function code tables into the door lock end through the Bluetooth interface;

4. when the host needs to forward a temporary password to the tenant, the host chooses to share a one-time temporary password or a temporary password with a time limit to the tenant;

5. the host selects a temporary password in sequence from the 50 8-digit random passwords through the door lock APP, and then selects a corresponding 4-digit function code from the pre-stored temporary password table according to the password type required by the tenant, and passes a 8+4 digit temporary password to the tenant;

6. the host shares this 8+4-digit number with the tenant through different methods such as SMS and Email;

7. when the tenant receives the 12-digit temporary password, he or she long press a PG key of the lock keyboard to enter the password activation function;

8. after entering the password activation function, the tenant enters the 12-digit temporary password twice on the keyboard to complete the activation;

9. after the temporary password is activated, the tenant can use this 8-digit password to open the door; if the corresponding function code indicates that the temporary password is a one-time password, the temporary password will become invalid after one use; and if the corresponding function code indicates the expiration date of the temporary password, it will automatically become invalid after the expiration date; and 10. when the available temporary passwords are less than the set number, and if the owner wants to continue to assign temporary passwords, the APP will remind the owner to set new 50 temporary passwords; there are two ways to set new temporary passwords: first, when the owner is far away from the door lock, and when the new temporary passwords need to be passed on to the next tenant, the next tenant can download the door lock APP, and set 50 new temporary passwords on the door lock end through the Bluetooth interface; second, when the owner is next to the door lock end, the owner himself connects the door lock end via Bluetooth and sets a new 50 temporary passwords to store the door lock end.

Based on the foregoing embodiments, the most beneficial effects of the embodiments of this application are as follows.

The embodiments of the application use this mechanism to generate multiple temporary passwords at once and store them in the random code use end. The temporary password is managed through the random code generator end, and the verification process of the random code use end is also controlled. On the other hand, the embodiment of this application does not need to temporarily authorize the user to operate the APP in person to obtain a temporary password to unlock. The generated temporary passwords can be sent to the temporarily authorized user through various methods remotely, which improves the flexibility of the solution.

In the method described in the embodiments of the present application, the temporary password includes a random code and a function code, and the function code can be used to control the activation state of the temporary password, and to indicate the timeliness or use of the temporary password, and to represent the user's identity information of the temporary password. In the embodiments of the application, the function code is used to quickly activate the temporary password, and flexibly control the time limit and the number of uses of the temporary password. The embodiments of the application can identify the identity information of the person who unlocked the door and entered a room through the setting of the function code, to realize the recording of the situation.

In summary, the embodiments of this application solve the shortcomings in the prior art that the activation control and invalidation processing mechanism of the temporary passwords are not flexible enough and the operation is complicated and obtain enhanced user experience. In the prior art, it is necessary to temporarily authorize users to install the door lock APP, and obtain the temporary passwords and unlock the lock by operating the door lock APP.

The above embodiments are only part of the implementation of this application. For those of ordinary skill in the art, without departing from the principle of the embodiments of this application, several improvements and modifications can be made. These improvements and retouching should also be regarded as within the scope of protection of this application.

The invention claimed is:

1. A method for controlling the use of a temporary password, comprising the following steps:
generating, by a random code generator end, a preset number of temporary passwords after successful matching between the random code generator end and a random code use end;
sending, by the random code generator end, at least one temporary password among the preset number of temporary passwords to the random code use end for storage therein to form a preset temporary password;
receiving, by the random code user end, a current temporary password, comparing the current temporary password with each of the pre-stored temporary passwords, and indicating successful verification if the current temporary password is the same as one of the pre-stored temporary passwords; wherein each temporary password includes a random code; wherein the step of receiving by the random code user end a current temporary password, comparing the current temporary password with each of the pre-stored temporary passwords, and indicating successful verification if the current temporary password is the same as one of the pre-stored temporary passwords comprises:
when being confirmed by the random code use end that the current temporary password includes a function code, determining what functions are represented by the function code; and
performing corresponding operations according to the functions of the function code; wherein the function code is added to the temporary password in a suffix, prefix, or embedded form, and the functions of the function code includes any one or more of the following functions:
controlling an activation state of the temporary password, indicating the timeliness of the temporary password, or representing the identity information of a user of the temporary password.

2. The method as recited in claim 1, wherein the step of receiving by the random code user end a current temporary password, comparing the current temporary password with each of the pre-stored temporary passwords, and indicating successful verification if the current temporary password is the same as one of the pre-stored temporary passwords further comprises:
performing post-successful verification operations when the current temporary password does not contain the function code, and it is determined that the current temporary password is already in an activated state, and the current temporary password is the same as one of the pre-stored temporary passwords; wherein the function code is added to the temporary password in a suffix, prefix, or embedded form, and the functions of the function code includes any one or more of the following functions:
controlling an activation state of the temporary password, indicating the timeliness of the temporary password, or representing the identity information of a user of the temporary password.

3. The method as recited in claim 1, wherein the step of generating by a random code generator end a preset number of temporary passwords after successful matching between the random code generator end and a random code use end includes:
generating by the random code generator respective function codes corresponding to the random codes, when generating the random codes; wherein the function code is added to the temporary password in a suffix, prefix, or embedded form, and the functions of the function code includes any one or more of the following functions:
controlling an activation state of the temporary password, indicating the timeliness of the temporary password, or representing the identity information of a user of the temporary password.

4. The method as recited in claim 1, further comprising, after sending at least one temporary password to the random code use end for storage therein to form a preset temporary password:
the random code generator receiving a password acquisition instruction, and displaying any one of the pre-stored temporary passwords on a user interface, so that said any one of the pre-stored temporary passwords is conveyed to the user and is marked.

5. The method as recited in claim 4, further comprising, after the random code generator receiving a password acquisition instruction, and displaying any one of the pre-stored temporary passwords on a user interface, so that said any one of the pre-stored temporary passwords is conveyed to the user and is marked:
displaying the number of remaining pre-stored temporary passwords on the user interface.

6. The method as recited in claim 5, further comprising:
when the number of the remaining pre-stored temporary passwords is less than the preset number, sending a notification message for resetting the temporary password.

7. The method as recited in claim 1, further comprising, after the step of receiving by the random code user end a current temporary password, comparing the current temporary password with each of the pre-stored temporary passwords, and indicating successful verification if the current temporary password is the same as one of the pre-stored temporary passwords:
invaliding the pre-stored temporary password when the random code use end detects that a corresponding device is restored to an initial state.

8. The method as recited in claim 1, wherein the step of generating by a random code generator end a preset number of temporary passwords after successful matching between the random code generator end and the random code use end includes:
   the random code generator end receiving a pairing code of the random code use end, and matching the pairing code with the random code use end; and
   automatically generating the temporary passwords by a built-in encryption algorithm of the random code generator end after the matching is successful.

9. The method as recited in claim 8, wherein the random code generator end receiving a pairing code of the random code use end, and matching the pairing code with the random code use end includes:
   the random code generator receiving the pairing code and performing authentication according to the pairing code, and when the authentication is passed, the random code generator end and the random code use end are matched successfully, so that the random code generator end obtains the control authority of the random code use end.

* * * * *